US007240568B2

(12) United States Patent
Atkinson

(10) Patent No.: US 7,240,568 B2
(45) Date of Patent: Jul. 10, 2007

(54) METHOD AND APPARATUS FOR DETERMINING THE GAS FLOW RATE OF A GAS-LIQUID MIXTURE

(75) Inventor: David Ian Heaton Atkinson, Ely (GB)

(73) Assignee: Schlumberger Technology Corporation, Ridgefield, CT (US)

(*) Notice: Subject to any disclaimer, the term of this patent is extended or adjusted under 35 U.S.C. 154(b) by 0 days.

(21) Appl. No.: 10/547,257

(22) PCT Filed: Mar. 10, 2004

(86) PCT No.: PCT/GB2004/001005

§ 371 (c)(1),
(2), (4) Date: Jun. 5, 2006

(87) PCT Pub. No.: WO2004/083788

PCT Pub. Date: Sep. 30, 2004

(65) Prior Publication Data

US 2006/0236779 A1 Oct. 26, 2006

(30) Foreign Application Priority Data

Mar. 18, 2003 (GB) ................... 0306138.9

(51) Int. Cl.
G01F 1/44 (2006.01)

(52) U.S. Cl. .................................. 73/861.63
(58) Field of Classification Search ........... 73/861.63, 73/861.04, 861.08, 861.18, 861.52, 861.61
See application file for complete search history.

(56) References Cited

U.S. PATENT DOCUMENTS

| 4,856,344 A | 8/1989 | Hunt |
| 6,234,030 B1* | 5/2001 | Butler ................ 73/861.04 |
| 6,382,032 B1 | 5/2002 | Hatton et al. |
| 6,405,604 B1* | 6/2002 | Berard et al. ......... 73/861.63 |
| 6,603,047 B2* | 8/2003 | Wiese et al. ............ 568/345 |

FOREIGN PATENT DOCUMENTS

GB 2 351 810 B 1/2001

* cited by examiner

Primary Examiner—Jewel Thompson
(74) Attorney, Agent, or Firm—Dale Gaudier; Steven Gahlings; Jody Lynn Destefanis

(57) ABSTRACT

A method and apparatus are provided for determining the gas flow rate of a gas-liquid mixture which has a gas volume fraction (GVF) of at least 85% and which is conveyed along a conduit. The conduit is fitted with a differential pressure flow meter and a fluid densitometer. The method comprises: measuring the pressure difference across the differential pressure flow meter and measuring the density of the mixture using the densitometer; estimating the GVF of the mixture from the measured density; and calculating the gas flow rate from the measured pressure difference and measured density. A corrective term which comprises the estimated GVF is used in the calculation to correct the gas flow rate for the high GVF value of the mixture.

19 Claims, 8 Drawing Sheets

METHOD AND APPARATUS FOR DETERMINING THE GAS FLOW RATE OF A GAS-LIQUID MIXTURE

FIELD OF THE INVENTION

The present invention relates to a method and apparatus for determining the gas flow rate of a gas-liquid mixture, and in particular a gas-liquid mixture having a gas volume fraction of at least 85%.

BACKGROUND OF THE INVENTION

The determination of gas and liquid flow rates in gas-liquid mixtures are important measurements in the oil and gas industry.

An example of an apparatus for measuring such flow rates is Schlumberger's PhaseTester™ VenturiX™ system (see e.g. I. Atkinson, M. Berard, B-V Hanssen, G. Ségéral, 17$^{th}$ International North Sea Flow Measurement Workshop, Oslo, Norway 25-28 Oct. 1999 "New Generation Multiphase Flowmeters from Schlumberger and Framo Engineering AS"; and http://www.slb.com/oilfield/index.cfm?id=id32270) which comprises a vertically mounted Venturi flow meter, a dual energy gamma-ray hold up measuring device and associated processors. This system successfully allows the simultaneous calculation of gas, water and oil volumetric flow rates in multi phase flows.

However, with conventional implementations of VenturiX™ technology the accuracy of the calculations starts to degrade as the gas volume fraction (GVF) increases above about 85% (the GVF being defined as the gas volumetric flow rate divided by the total volumetric flow rate of the gas-liquid mixture). This can be a problem because as oil wells age the GVF increases towards 100% and as gas wells age the GVF decreases from 100%. One reason for the drop in accuracy is that at low mixture densities (i.e. high GVFs), the accuracy of high energy gamma-ray density measurements starts to fall. A more fundamental reason, however, is that an underlying assumption of the calculations starts to break down at high GVFs. This assumption is that the total mass flow rate of the mixture is approximately equal to the liquid mass flow rate. The problem becomes particularly severe above about a GVF of 95%. Under flow conditions typical in North Sea natural gas production, a GVF of 95% approximately corresponds to the liquid mass flow rate being equal to the gas mass flow rate. Shell Expro have defined the wet gas range as a flow with a GVF>95% (R. N. Steven, "Wet Gas Metering with a Horizontally Mounted Venturi Meter", Flow Measurement and Instrumentation, 2002, 361-372).

One approach to overcome this problem is to separate the fluid mixture into gas and liquid phases and measure the flow rate of each phase using conventional flow metering techniques. However, this relies on the efficient separation of the gas and liquid phases, which is difficult to perform reliably. Furthermore the equipment tends to be bulky and expensive.

Other investigators (e.g. Steven ibid.; and Z. H. Lin, "Two-Phase Flow Measurements with Orifices", Encyclopaedia of Fluid Mechanics, Chapter 29, Vol. 3, Gulf, 1986) have proposed expressions for calculating the flow rate of a multi phase mixture through an orifice plate or a Venturi flow meter. The aim of most has been to find a universal expression/experimental correlation for calculating the flow rate at all GVF values. Although many expressions have been proposed, there is no agreement as to which is the most accurate. However, the differences between the correlations are small when they are used to calculate the flow rate of a wet gas. Steven ibid. provides a summary of two wet gas correlations for horizontal Venturi flow meters and five for orifice plate flow meters. The correlations assume that the flows are incompressible, there are no appreciable thermodynamic effects and the liquid flow rate is initially known.

The correlations are all based on the principle of relating the gas mass flow rate, $Q_g$, to a "pseudo single phase gas mass flow rate", $Q_{tp}$, calculated from the standard Venturi/orifice plate equation using the measured differential pressure, $\Delta P$, and the gas density, $\rho_g$:

$$Q_{tp} = K_g A_T \sqrt{2\rho_g \Delta P}$$

$$Q_g = f(Q_{tp}, Q_l/Q_g)$$

where $A_T$ is the Venturi throat cross-sectional area, $K_g$ is a function of the discharge coefficient and Venturi dimensions, and $Q_l$ is the liquid mass flow rate.

Alternatively, the correlations can, of course, be expressed in terms of a "pseudo single phase gas volume flow rate", $q_{tp}$:

$$q_{tp} = K_g A_T \sqrt{\frac{2\Delta P_{tp}}{\rho_g}}$$

$$q_g = f(q_{tp}, q_l/q_g)$$

Essentially, correcting $Q_{tp}$ or $q_{tp}$ for multi phase flow based on the relative gas/liquid phase content gives the gas flow rate. However, in order to perform this correction the correlations require an additional input. A number of investigators have used the liquid flow rate, which can be measured using a tracer dilution technique (see e.g. N. Nederveen, G. V. Washington, F. H. Batstra, "Wet Gas Flow Measurement" SPE 19077, 1989; R. de Leeuw, "Liquid Correction of Venturi Meter Readings in Wet Gas Flow", North Sea Flow Measurement Workshop, Norway, 1997; A. B. Al-Taweel, S. G. Barlow, "Wellsite Wet Gas Measurement System in Saudi Arabia" SPE 49162, 1998; and M. R. Konopczynski, H. de Leeuw, "Large Scale Application of Wet Gas Metering at the Oman Upstream LNG Project", SPE 62119, 2000). However, tracer measurements involve practical difficulties and can be inconvenient to perform. For example, an upstream location has to be adapted and made available for tracer injection and usually a technician has to be present. Moreover tracer measurements are typically non-continuous.

Another approach is embodied in the Solartron ISA Dualstream II™ differential pressure based metering system. The system comprises three stages: a proprietary upstream flow conditioner, a classical Venturi flow meter and a second proprietary differential pressure flow meter. The system operates on the principle that the second differential pressure flow meter exhibits a significantly different response to the presence of liquid in the gas stream than the Venturi flow meter. Consequently the two flow meters provide two independent simultaneous equations derived from a wet gas correlation that can be solved to give the gas and liquid flow rates.

Notation

The following notation is used herein:
q=volumetric flow rate (m³/s)
Q=mass flow rate (kg/s)

ρ=density (kg/m$^3$)
η=dynamic viscosity (Pa·s)
ε=gas expansivity
ΔP=differential pressure across the Venturi (Pa)
GVF=gas volume fraction (i.e. gas volumetric flow rate divided by the total volumetric flow rate)
α=hold up
wlr=water liquid ratio=$q_w/q_l$
M=Murdock coefficient
C=discharge coefficient
$A_T$=cross-sectional area of Venturi throat (m$^2$)
d=Venturi throat diameter (m)
D=Venturi inlet diameter (m)
h=distance between differential pressure tappings (m)
β=d/D
E=1/(1−β$^4$)$^{0.5}$
K=Flow coefficient ($K_l=C_l E$ and $K_g=C_g E\epsilon$)
g=acceleration due to gravity (m$^2$/s)
V=superficial velocity (m/s)
Re=Reynolds Number
Fr=Froude Number $$X = \text{Lockhart-Martinelli parameter} = \frac{q_l}{q_g}\sqrt{\frac{\rho_l}{\rho_g}} = \frac{Q_l}{Q_g}\sqrt{\frac{\rho_g}{\rho_l}}$$

Subscripts:
l=liquid
g=gas
o=oil
w=water
m=mixture
tp=pseudo single phase

SUMMARY OF THE INVENTION

The present invention is at least partly based on the realisation that a differential pressure flow meter and densitometer system can be adapted to provide flow rate measurements of reasonable accuracy at high GVFS, the densitometer providing the additional input for correcting a pseudo single phase gas flow rate.

A first aspect of the invention provides a method of determining the gas flow rate of a gas-liquid mixture which has a GVF of at least 85% and which is conveyed along a conduit fitted with a differential pressure flow meter and a fluid densitometer, the method comprising:
measuring the pressure difference across the differential pressure flow meter and measuring the density of the mixture using the densitometer;
estimating the GVF of the mixture from the measured density; and
calculating the gas flow rate from the measured pressure difference and measured density, a corrective term which comprises the estimated GVF being used in the calculation to correct the gas flow rate for the high GVF value of the mixture.

Thus by using a corrective term which comprises the estimated GVF instead of the liquid flow rate, it is possible to avoid the practical difficulties associated with tracer dilution techniques for measuring the liquid flow rate.

In preferred embodiments, the corrective term comprises a form of the Lockhart-Martinelli parameter, X. In particular, we have realised that this parameter can be expressed in terms of GVF as:

$$X = \sqrt{\frac{\rho_l}{\rho_g}}\left(\frac{1-GVF}{GVF}\right).$$

Advantageously, the method can be implemented on existing flow rate measuring platforms such as the VenturiX™ system without extensive hardware modifications.

Preferably the densitometer is a gamma-ray densitometer. Alternatively or additionally the differential pressure flow meter may be a Venturi flow meter.

The flow meter may be arranged such that the flow through the meter is substantially vertical. Such an arrangement helps to avoid stratification (and thereby improves the mixing) of the gas and liquid phase in the flow meter. Particularly when a gamma-ray densitometer is used to measure the density, stratification can lead to errors in the density measurements.

Using the method of this aspect it is possible to calculate gas flow rates in the high GVF regime to an accuracy of at least ±15% and preferably at least ±10%.

In general, better accuracies are obtained at higher GVFs. So preferably the GVF of the mixture is at least 90% and more preferably at least 95%.

The method may further comprise the step of calculating the liquid flow rate of the mixture from the calculated gas flow rate and the estimated GVF.

Preferably the gas-liquid mixture is production fluid from a hydrocarbon well. Such fluid typically comprises natural gas, oil, water and other liquids which may be present, such as methanol.

A further aspect of the invention provides an apparatus for determining the gas flow rate of a gas-liquid mixture which has a gas volume fraction (GVF) of at least 85% and which is conveyed along a conduit, the apparatus comprising:
a differential pressure flow meter and a fluid densitometer which are adapted to be fitted to the conduit, whereby, in use, a pressure difference is measured across the flow meter and the density of the mixture is measured by the densitometer; and
a processor which is configured to (a) estimate the GVF of the mixture from the measured density, and (b) calculate the gas flow rate from the measured pressure difference and measured density, a corrective term which comprises the estimated GVF being used in the calculation to correct the gas flow rate for the high GVF value of the mixture.

Thus the apparatus is adapted to perform the method of the first aspect. Any one or any combination of the optional features of the first aspect may be applied to the further aspect. The apparatus may be fitted to the conduit.

BRIEF DESCRIPTION OF THE DRAWINGS

Specific embodiments of the present invention will now be described with reference to the following drawings in which.

as a function of GVF.

DETAILED DESCRIPTION

Figure 1:
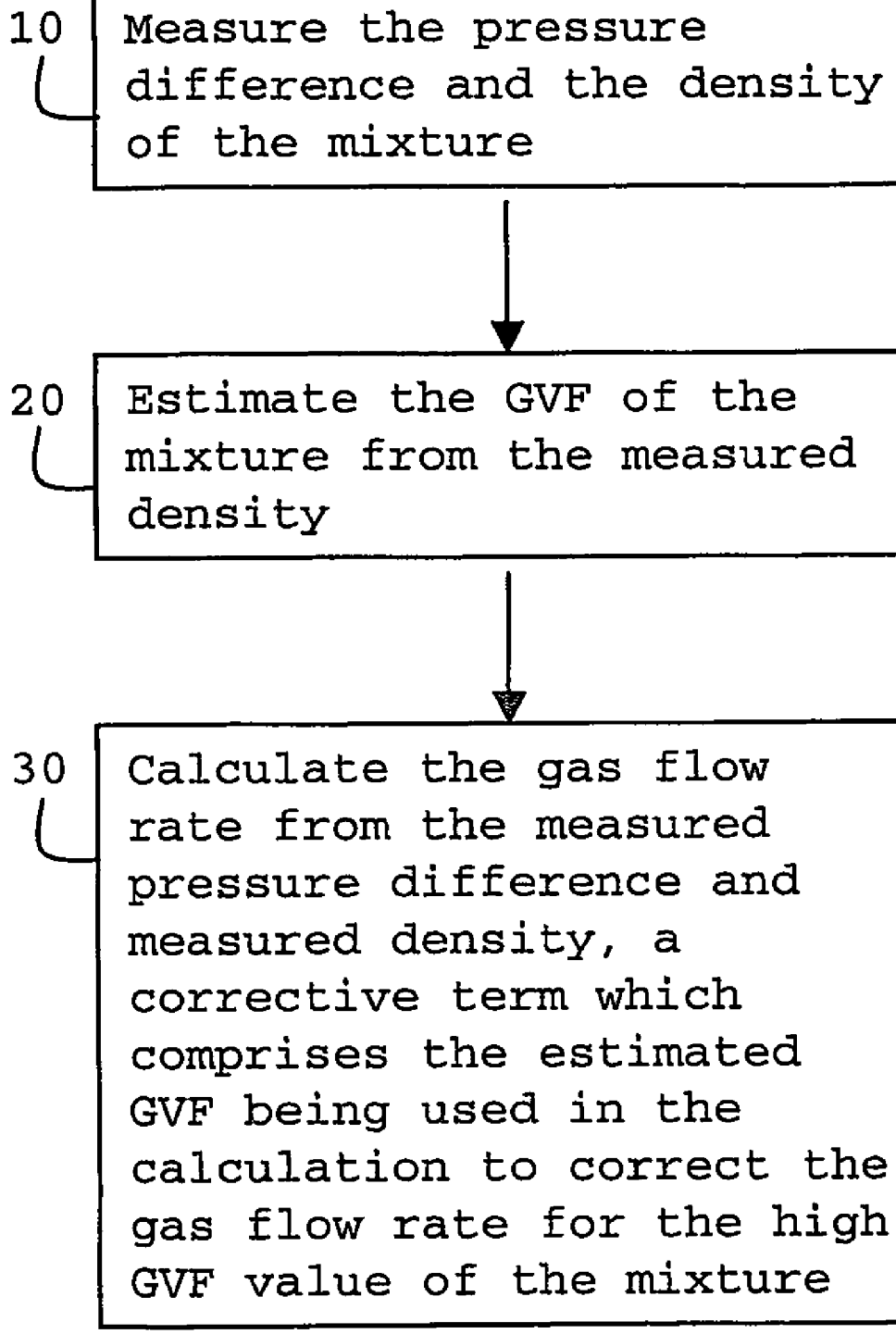
FIG. 1 is a flow chart illustrating a method of determining the gas flow rate of a gas-liquid mixture according to the present invention.

FIG. 1 is a flow chart illustrating a method of determining the gas flow rate of a gas-liquid mixture according to the present invention. The gas-liquid mixture has a gas volume fraction (GVF) of at least 85% and is conveyed along a conduit fitted with a differential pressure flow meter and a fluid densitometer. In step 10, the pressure difference and the density of the mixture are measured. Next, in step 20, the GVF of the mixture is estimated from the measured density. Finally, in step 30, the gas flow rate is calculated from the measured pressure difference and measured density, a corrective term which comprises the estimated GVF being used in the calculation to correct the gas flow rate for the high GVF value of the mixture. For the final calculation step, the method draws on correlations such as:

$$q_g = f(q_{tp}, q_l/q_g)$$

discussed briefly above. Before considering further examples of the present invention, it is useful to consider examples of such correlations in more detail.

Flow Rate Correlations at High GVF (i) Murdock Correlation

For an orifice plate in a horizontal pipe Murdock (J. W. Murdock, "Two Phase Measurements with Orifice Plates", Journal of Basic Engineering, Trans ASME, 1962, 567-582) obtained the following correlation:

$$\frac{q_{tp}}{q_g} = 1 + M \cdot X \frac{K_g}{K_l}$$

$$M = 1.26$$

Murdock's analysis considered the two phase flow to be separated (stratified flow) and ignored any interaction (momentum interchange) between the gas and liquid phases. The theoretical relationship was correlated with experimental data covering: water/steam flow at 40 bar; air/water and gas/water flow at atmospheric pressure; gas with distillate, fresh and salt water between pressures of 8 and 64 bars. Steven ibid. provides an update for the correlation using data from a Venturi meter located on a hydrocarbon production well at 45 bar, the parameter M being set equal to 1.5.

(ii) Chisholm Correlation

Chisholm has published a general two phase orifice meter correlation (D. Chisholm, "Two-Phase Flow Through Sharp Edged Orifices", J. Mechanical Engineering Sciences, 1977, 128-130):

$$\frac{q_{tp}}{q_g} = \sqrt{1 + MX\frac{K_g}{K_l} + \left(X\frac{K_g}{K_l}\right)^2}$$

$$M = \frac{1}{F}\left(\frac{\rho_l}{\rho_g}\right)^{0.5} + F\left(\frac{\rho_g}{\rho_l}\right)^{0.5}$$

$$X \le 1 : F = \left(\frac{\rho_l}{\rho_g}\right)^{0.25}$$

$$X > 1 : F = \left(\frac{\rho_l}{\rho_{homogeneous}}\right)^{0.5}$$

Chisholm's model assumes horizontal stratified flow through an orifice plate. The shear force at the boundary is considered and the equations were solved in terms of momentum (see Nederveen ibid.)

(iii) de Leeuw Correlation

The de Leeuw correlation (see de Leeuw ibid.) is a wet gas correlation for a horizontally arranged Venturi.

$$\frac{q_{tp}}{q_g} = \sqrt{1 + MX + X^2}$$

$$M = \left(\frac{\rho_l}{\rho_g}\right)^n + \left(\frac{\rho_g}{\rho_l}\right)^n$$

$$n = 0.41 \quad 0.5 \le Fr_g \le 1.5$$

$$n = 0.606(1 - e^{-0.746 Fr_g}) \quad Fr_g \ge 1.5$$

$$Fr_g = \frac{V_g}{\sqrt{gD}}\sqrt{\frac{\rho_g}{\rho_l - \rho_g}}$$

This correlation is of the same form as Chisholm's with the M term having a power dependence on the gas Froude number. de Leeuw's empirical fit was based on flow loop tests using nitrogen and diesel oil at line pressures in the range 15 to 90 bar (SINTEF Multiphase Flow Laboratory, Trondheim, Norway).

To make use of these correlations, therefore, an investigator measures the pseudo single phase flow rate, $$q_{tp} = K_g A_T \sqrt{\frac{2\Delta P_{tp}}{\rho_g}}$$

and then applies the chosen correlation to derive $q_g$. At high GVFs, the right hand side of each of the above expressions for $q_{tp}/q_g$ is effectively a corrective term for correcting the gas flow rate. Each of these terms contains the Lockhart-Martinelli parameter, X, and to derive a value for X a further input is required. Conventionally most investigators have used $q_l$ measured using a tracer dilution technique.

VenturiX™ Data at High GVF

We now show examples of Murdock, Chisholm and de Leeuw correlations evaluated using 85%<GVF<98% flow loop VenturiX™ data, i.e. for flow through a vertically arranged Venturi flow meter. The data comprises measurements of $\Delta P$ and $\rho_m$ for known reference values of GVF and gas volumetric flow rate. For each correlation the "measured" and "calculated" pseudo single phase volumetric flow rates were compared, the measured flow rate being obtained from:

$$q_{tp} = C_g E A_T \varepsilon \sqrt{\frac{2\Delta P^*}{\rho_g}}$$

and the calculated flow rate from:

$$q_{tp} = q_g \cdot f(M, X, \text{etc.})$$

where $\rho_g$ is the gas density calculated for the relevant pressure and temperature, the corrected differential pressure $\Delta P^* = \Delta P - \rho_m g h$ ($\rho_m$ being measured by the high energy beam of the VenturiX™ dual energy gamma-ray device and h being the hydrostatic head), and the precise form of f(M, X, etc.) depends on the particular correlation under evaluation. The values of $\Delta P$ and $\rho_m$ used in the calculations were based on average values from approximately 6 minutes of measurements at 45 Hz. For each correlation the value for M was fixed at 1.26.

Figure 2:
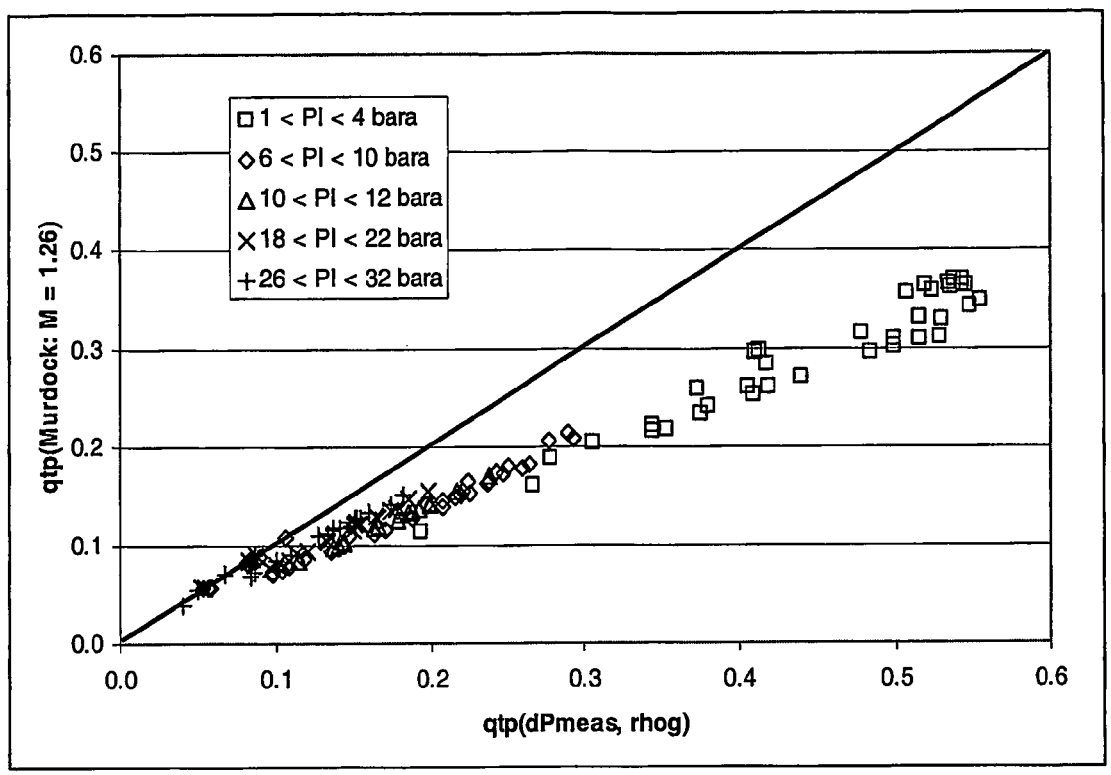
FIG. 2 shows a plot of calculated pseudo single phase volumetric flow rate for VenturiX™ flow loop data using the Murdock correlation against measured pseudo single phase volumetric flow rate derived from the same data.

FIG. 2 shows the Murdock correlation applied to the VenturiX™ flow loop data. There is no significant line pressure effect and the data all fall on a single line. The gradient of the line is not unity, but this is due the value of M which has not been tuned to the VenturiX™ data.

Figure 3:
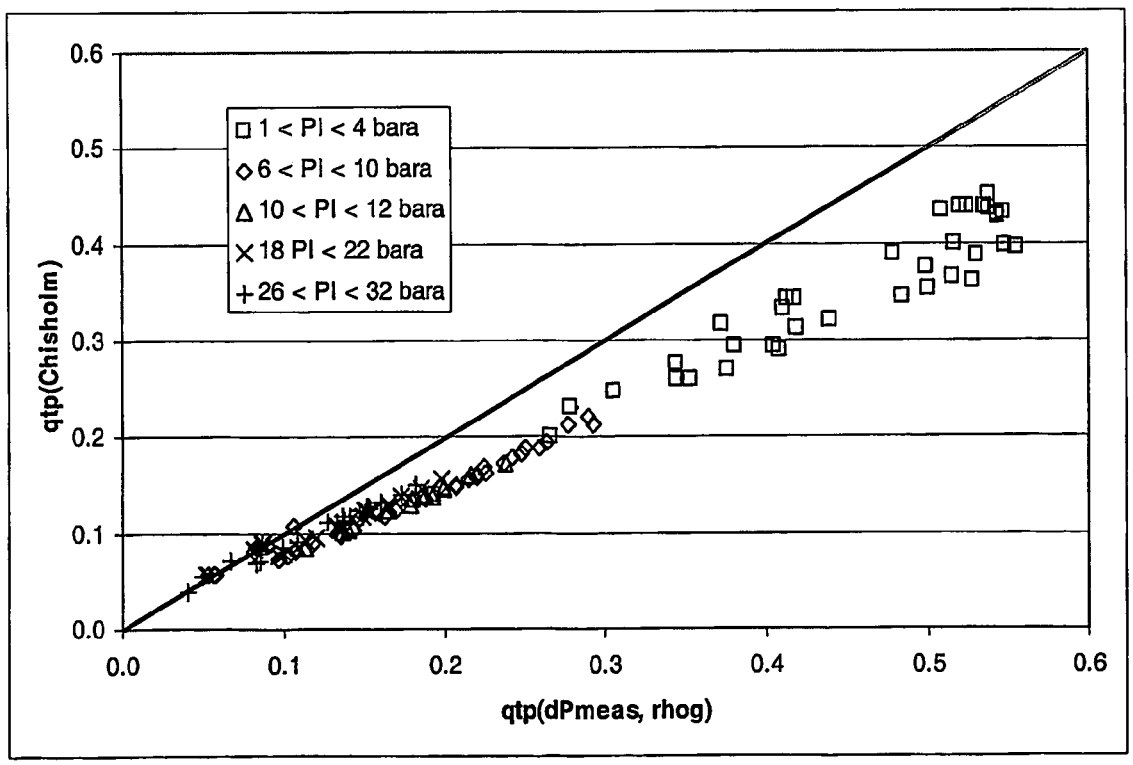
FIG. 3 shows a plot of calculated pseudo single phase volumetric flow rate using the Chisholm correlation against measured pseudo single phase volumetric flow rate based on the same data as FIG. 2.

FIG. 3 shows the Chisholm correlation applied to the VenturiX™ flow loop data. At line pressures greater than ~5 bar the Murdock and Chisholm correlations give almost identical results; at pressures less than ~5 bar there are slight differences between the two correlations.

Figure 4:
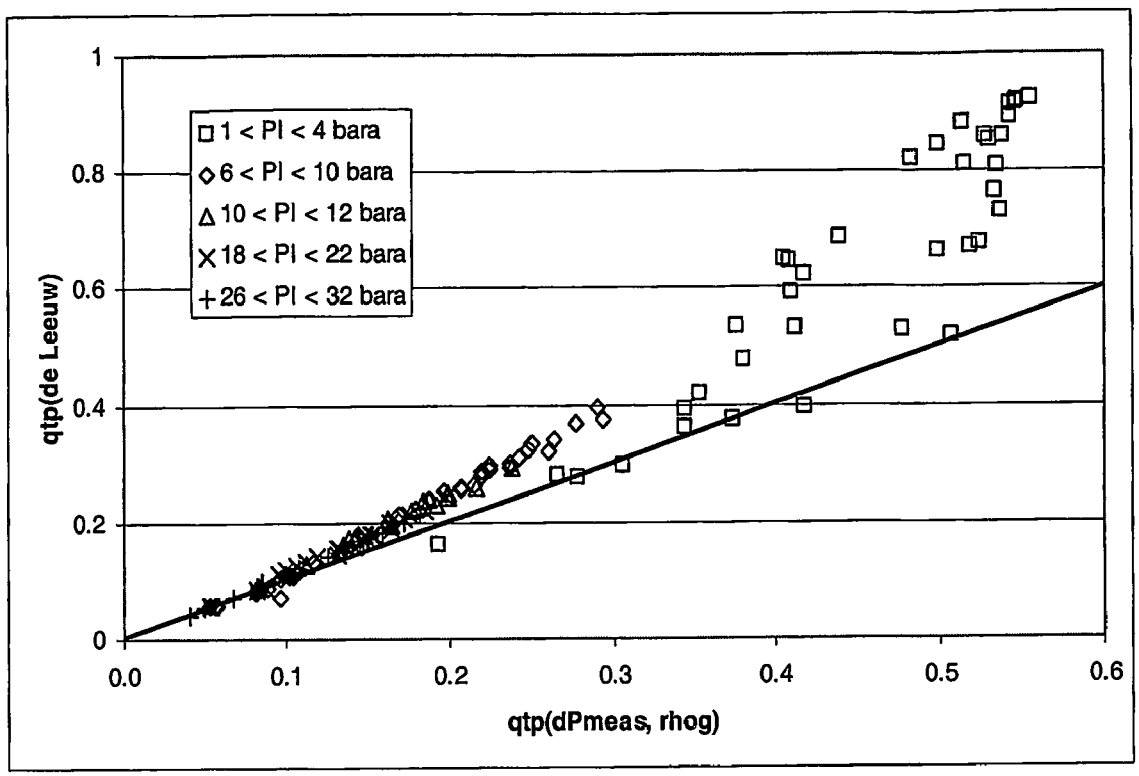
FIG. 4 shows a plot of calculated pseudo single phase volumetric flow rate using the de Leeuw correlation against measured pseudo single phase volumetric flow rate based on the same data as FIG. 2.

FIG. 4 shows the de Leeuw correlation applied to the VenturiX™ flow loop data. This correlation shows reasonable agreement at pressures greater than ~5 bar and low total volume flow rates. At low pressures (<~5 bar) there is a greater scatter on the data compared with the Murdock or Chisholm correlations.

None of the results of applying the Murdock, Chisholm and de Leeuw correlations to the VenturiX™ flow loop data show a dependence on the line pressure. Surprisingly, these correlations, based upon a stratified flow model for a horizontal Venturi (de Leeuw) or orifice plate (Murdock and Chisholm) meters, give reasonable results for vertically upward flow where it is unlikely that the flow is stratified.

Measuring Flow Rates at High GVFs

A realisation which led to the present invention was that the further input does not need to be $q_l$, but can instead be an estimated value for the GVF. $q_l$ can then be calculated along with $q_g$. In the above correlations the further input enters via the Lockhart-Martinelli parameter which can be rewritten as:

$$X = \sqrt{\frac{\rho_l}{\rho_g}} \left(\frac{1-GVF}{GVF}\right).$$

An additional realisation was that an estimate for the GVF can be derived by densitometry, which in many situations is more convenient to perform than tracer measurements. Densitometry measurements of the gas-liquid mixture density, $\rho_m$, provide the gas hold up via the relation:

$$\alpha_g = \frac{\rho_l - \rho_m}{\rho_l - \rho_g}$$

$\rho_l$ and $\rho_g$ being known at line conditions. At high GVFs and line pressures above about 5 bar, for the purpose of calculating $q_g$ there is little error in assuming no slip between the gas and liquid phases, so that the GVF can be set equal to the gas hold up, i.e.

$$GVF = \alpha_g,$$

whereby $$x = \sqrt{\frac{\rho_l}{\rho_g}} \left(\frac{\rho_m - \rho_g}{\rho_l - \rho_m}\right).$$

However, for line pressures of less than about 15 bar this assumption tends to produce inaccuracies in the calculated values for $q_l$. Thus, alternatively, a slip law can be used to relate GVF to $\alpha_g$. Such slip laws are known in the art. For example:

$$GVF = \frac{\alpha_g V_g}{V_h}$$

where $V_g$ is the gas velocity and $V_h$ is the homogeneous velocity defined as:

$$V_g = \frac{q_g}{\text{cross-section area}}$$

$$V_h = \frac{q_l + q_g}{\text{cross-section area}}$$

The slip velocity, $V_s$, is then related to $V_g$ and $V_h$ by an equation of the form:

$$V_g = C0 \cdot V_h + V_s$$

where $1 \leq C0 \leq 1.15$ (see T. Z. Harmathy, "Velocity of Large Drops and Bubbles in Media of Infinite or Restricted Extent", AIChJ. 1960, 6, p. 281; D. J. Nicklin, J. O. Wilkes, J. F. Davidson, "Two Phase Flow in Vertical Pipes", Trans. Inst. Of Chemical Engineers, 1962, p. 61; and A. R. Hasan, C. S. Kabir, "A Study of Multiphase Flow Behavior in Vertical Wells", SPE Production Engineering, 1988, p. 263).

$V_s$ has a known value which can, for example, be computed from the average of the terminal rise velocity of bubbles in a vertical column (Harmathy ibid.) or the rise velocity of a Taylor bubble (Nicklin ibid.).

The following iterative calculation can be used to determine GVF:

Initiate
  $GVF = \alpha_g$
Step 1
  Compute $q_g$ using the further iterative calculation for $q_g$ and $q_l$ described below
Step 2

$$V_g = \frac{q_g}{\Pi \frac{d^2}{4}}$$

$$V_h = \frac{V_g - V_s}{C0} \quad (C0 \text{ and } V_s \text{ being known})$$

Step 3
Calculate GVF:

$$GVF = \frac{\alpha_g V_g}{V_h}$$

Step 4
Iterate around Step 1 to step 3 until at iteration i for liquid and gas:

$$\Delta GVF = \text{abs}(GVF_i - GvF_{i-1}) < \text{error} = 10^{-4}$$

The fluid density can be measured using known devices, such as a gradiomanometer which measure the hydrostatic pressure of a column of fluid. However, at high GVFs frictional losses dominate the measured pressure leading to significant inaccuracies in the measured densities. Thus it is preferred to measure the density by gamma-ray densitometry.

Figure 5:
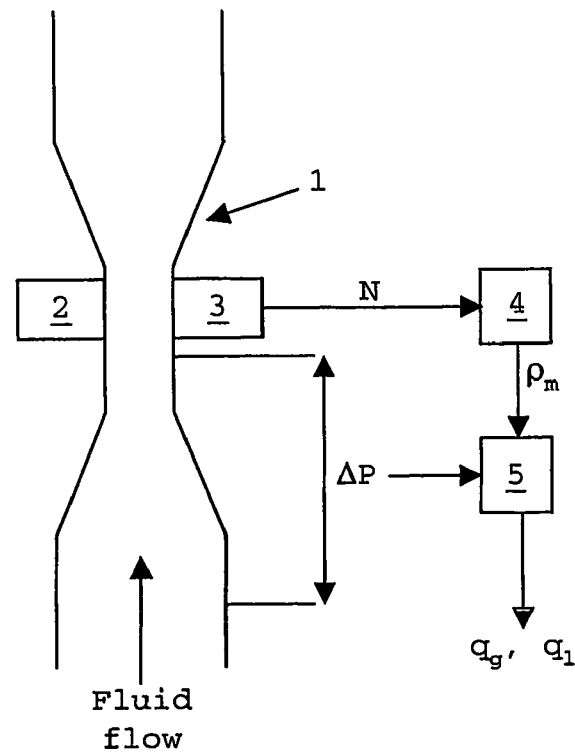
FIG. 5 is a schematic diagram of a system for performing flow rate measurements according to the present invention.

FIG. 5 is a schematic diagram of a system for performing flow rate measurements according to the present invention. The system comprises a Venturi flow meter 1 which is fitted to a conduit carrying a gas-liquid mixture (e.g. natural gas, oil and water). A gamma-ray source 2 and detector 3 are positioned at opposite sides of the throat region of the Venturi. The differential pressure, $\Delta P$, is measured across the Venturi and a gamma-ray signal is measured at the detector, both measurements being performed at high frequency (e.g. 45 Hz). The measurement signals are then sent to respective processors 4, 5.

At processor 5, the gamma-ray signals are converted into mixture density measurements, $\rho_m$, using relationships which are known in the art (see e.g. "Instrumentation Reference Book", edited by B. E. Noltingk, Butterworths, 1988). For example:

$$N = N_0 \exp(-\mu \rho_m d)$$

where N is the measured counts, $N_0$ is the counts from an empty line, $\mu$ is the mass attenuation coefficient, and d is the path length (e.g. Venturi throat diameter). At high energy ($> \sim 80$ keV) $\mu$ is a constant for oil/water/gas fluids practically encountered in the field.

The $\rho_m$ measurements are then sent to processor 4.

Processor 4 receives the $\rho_m$ measurements and also the differential pressure measurements, $\Delta P$, which are corrected for hydrostatic head using the expression:

$$\Delta P^* = \Delta P - \rho_m g h.$$

The $\rho_m$ measurements are converted into hold up values and then GVF estimates as described above.

In order to calculate $q_g$ and $q_l$, the following iterative calculation is performed by processor 4 using average values (obtained over a number of minutes) for $\Delta P^*$ and GVF:

Initiate
  $C_g = 1$ and $C_l = 1$
Step 1

$$q_g = \frac{C_g E A_T \varepsilon \sqrt{\frac{2\Delta P^*}{\rho_g}}}{1 + M \sqrt{\frac{\rho_l}{\rho_g}} \left(\frac{1 - GVF}{GVF}\right) \frac{C_g \varepsilon}{C_l}}$$

(typically $\rho_w \approx \rho_o$, so even if the liquid density $\rho_l = \text{wlr} \rho_w + (1-\text{wlr}) \rho_o$ at line conditions is not known, a reasonable estimate for $\rho_l$ can be made)

$$q_l = q_g \left(\frac{1 - GVF}{GVF}\right)$$

Step 2

$$V_l = \frac{q_l}{\Pi \frac{d^2}{4}}$$

$$V_g = \frac{q_g}{\Pi \frac{d^2}{4}}$$

$$Re_l = \frac{V_l \rho_l D}{\eta_l}$$

$$Re_g = \frac{V_g \rho_g D}{\eta_g}$$

($\eta_g \approx$ constant for hydrocarbon gases $\approx 12 \mu$ Pa.s)

Step 3
Calculate $C_l$, $C_g$:

$$C(Re) = a + b \log_{10}(Re)$$

$Re \geq 4 \cdot 10^5$
  $a = 0.981 \pm 0.003$, $b = 0$
$4 \cdot 10^5 > Re \geq 4 \cdot 10^3$
  $a = 0.861 \pm 0.01$, $b = 0.023 \pm 0.002$
$Re < 4 \cdot 10^3$
  $a = 0.298 \pm 0.02$, $b = 0.180 \pm 0.008$
$Re = 0$
  $a = 0.981$, $b = 0$ Step 4

Iterate around Step 1 to step 3 until at iteration i for liquid and gas:

$$\Delta C_{l,g} = abs(C_i - C_{i-1}) < \text{error} = 10^{-4}$$

Thus at the end of each iterative calculation predicted values for $q_g$ and $q_l$ are obtained. Note that in this example the Murdock correlation is used at Step 1. This correlation is the simplest to implement, involving the least number of variables to iterate about ($C_g$, $C_l$). Note also that the iterative calculation may be nested inside a loop for deriving the GVF from a slip law as described above.

Although, the Murdock, Chisholm and de Leeuw correlations were all originally derived for horizontally arranged flow meters and stratified flows, we have found that they also apply to vertically arranged flow meters and non-stratified flows. Thus a significant advantage of the method of the present invention is that it can be implemented on existing platforms, such as VenturiX™, which comprise a vertically arranged differential pressure flow meter, the high energy gamma ray beam of the VenturiX™ dual energy gamma-ray hold up measuring device being used to measure the gas-liquid mixture density. However, a modified form of the VenturiX™ system for performing the method could have a simpler and cheaper single energy gamma-ray densitometer instead of the dual energy device.

A further advantage associated with vertically arranged flow meters is that they improve fluid mixing, which in turn leads to more accurate gas-liquid mixture density measurements made by gamma-ray devices.

Tuning the Correlations

When using the above correlations, the Murdock coefficient, M, is preferably tuned for the particular line configuration.

For example, using the reference GVF, reference gas volumetric flow rate and measured differential pressure of a subset of the VenturiX™ flow loop data (30% of the data set: GVF>85%, line pressure>4 bar) in the Murdock correlation gives M=2.16±0.02.

Figure 6:
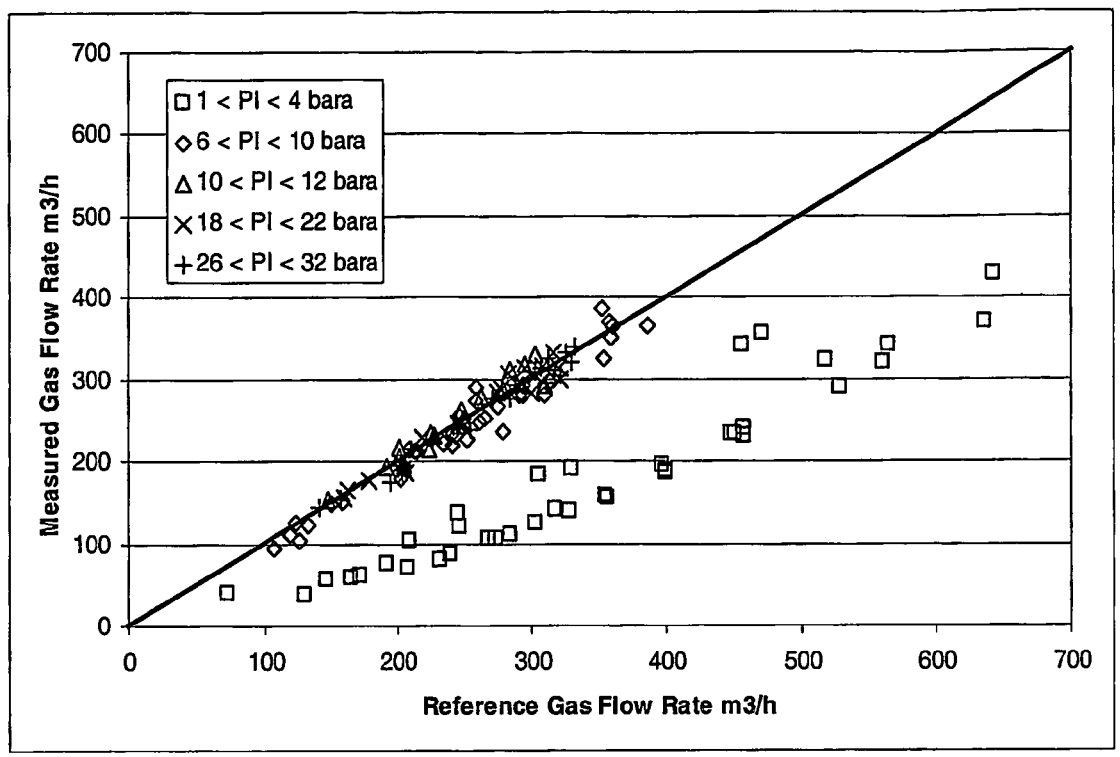
FIG. 6 shows a plot of predicted gas volumetric flow rate against the reference gas volumetric flow rate for the same data as FIG. 2.
Figure 7:
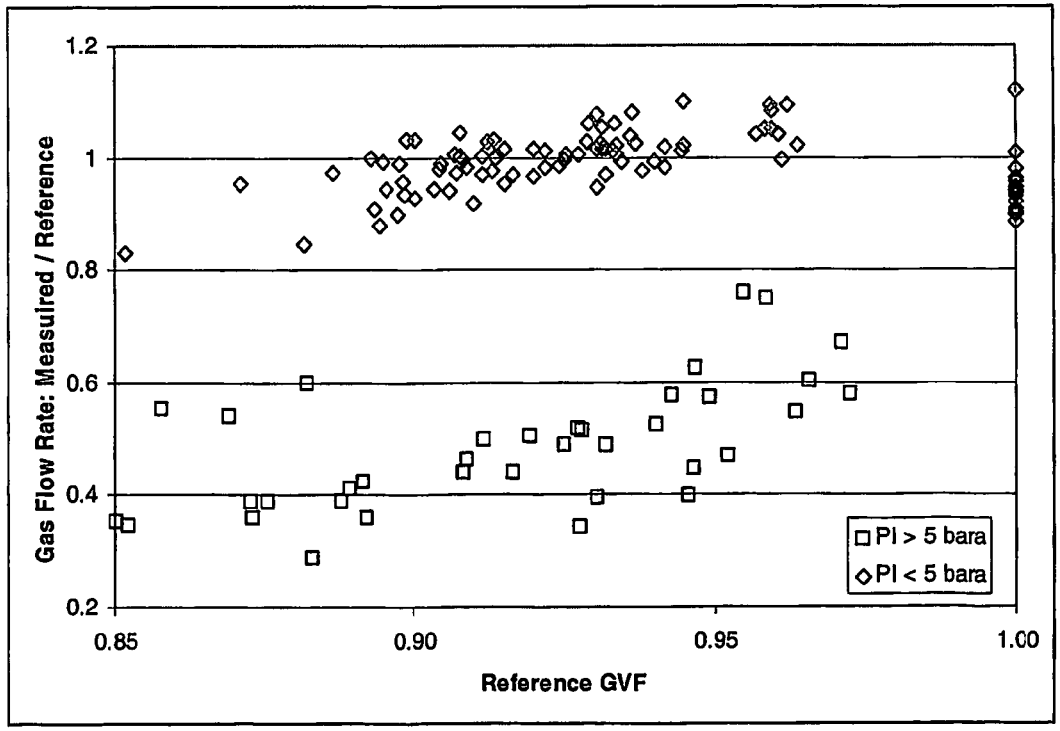
FIG. 7 shows a plot of the relative error in predicted gas volumetric flow rate as a function of reference GVF for the same data as FIG. 2.

FIG. 6 shows the predicted volumetric gas flow rate, $q_g$, for the entire set of flow loop data plotted against the reference gas volumetric flow rate. The predicted values for $q_g$ were obtained using the expression $$q_g = \frac{C_g E A_T \varepsilon \sqrt{\frac{2\Delta P^*}{\rho_g}}}{1 + 2.16 \sqrt{\frac{\rho_l}{\rho_g}} \left(\frac{1-GVF}{GVF}\right) \frac{C_g \varepsilon}{C_l}},$$

which incorporates the tuned Murdock coefficient. The expression was solved using a slip law to calculate GVF and the iterative calculation for $q_g$ described. FIG. 7 shows the relative error in $q_g$ as a function of reference GVF. The increased error as the line pressure falls below 4 bar is primarily due to the decreasing accuracy of the gamma-ray measurements at low pressures (the contrast between measured counts and the 'vacuum' counts becomes small).

The liquid volumetric flow rate, $q_l$, was also predicted for the flow loop data using the relation $$q_l = q_g \left(\frac{1-GVF}{GVF}\right).$$

Figure 8:
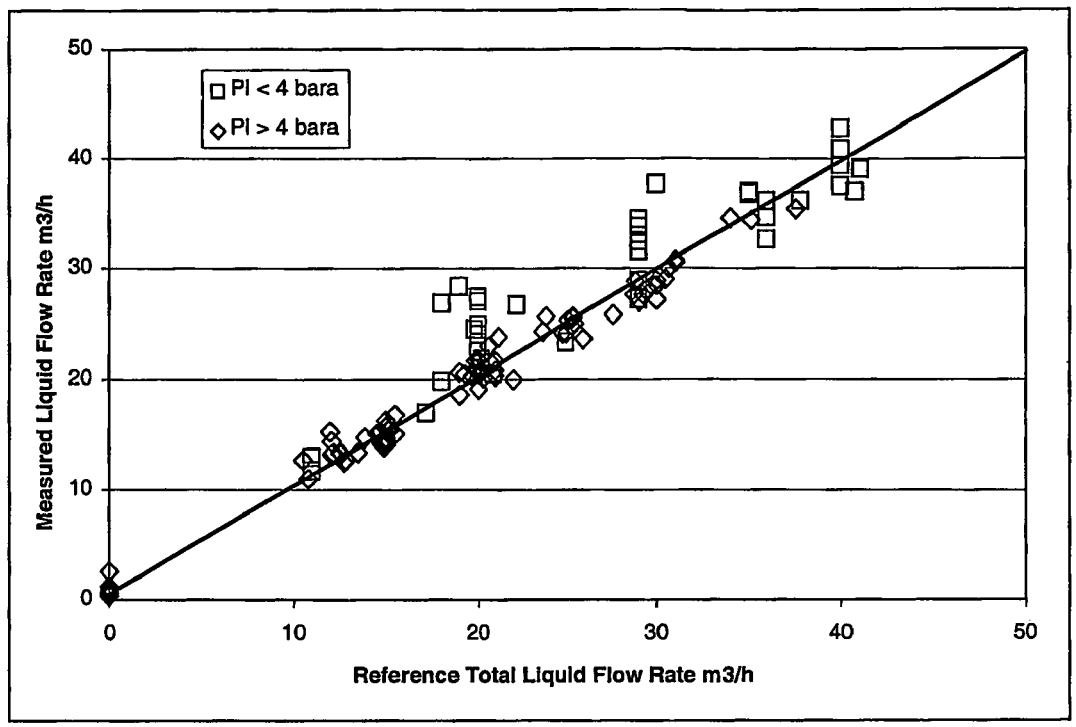
FIG. 8 shows a plot of predicted liquid volumetric flow rate against the reference liquid volumetric flow rate for the same data as FIG. 2.

FIG. 8 shows the predicted liquid volumetric flow rate plotted against the reference liquid volumetric flow rate.

Using the tuned Murdock correlation for line pressures greater than 4 bar and for GVF>85%, the predicted liquid and gas flow rates were accurate to ±10%.

Figure 9:
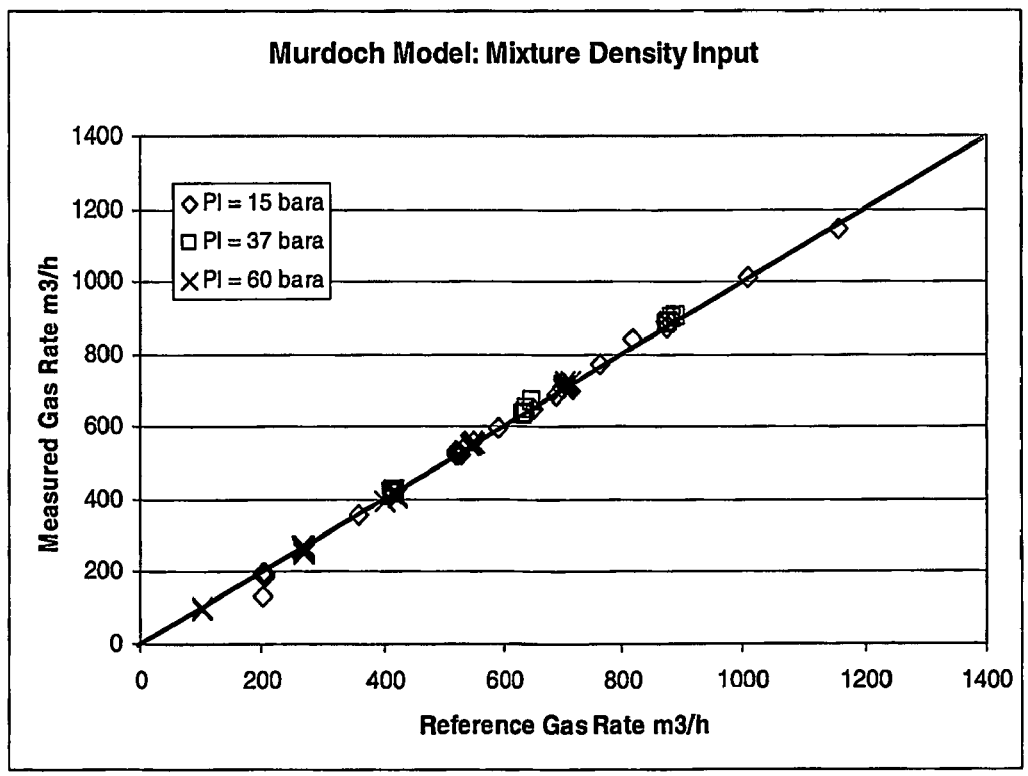
FIG. 9 shows a plot of predicted gas volumetric flow rate against the reference gas volumetric flow rate for a further set of VenturiX™ flow loop data.
Figure 10:
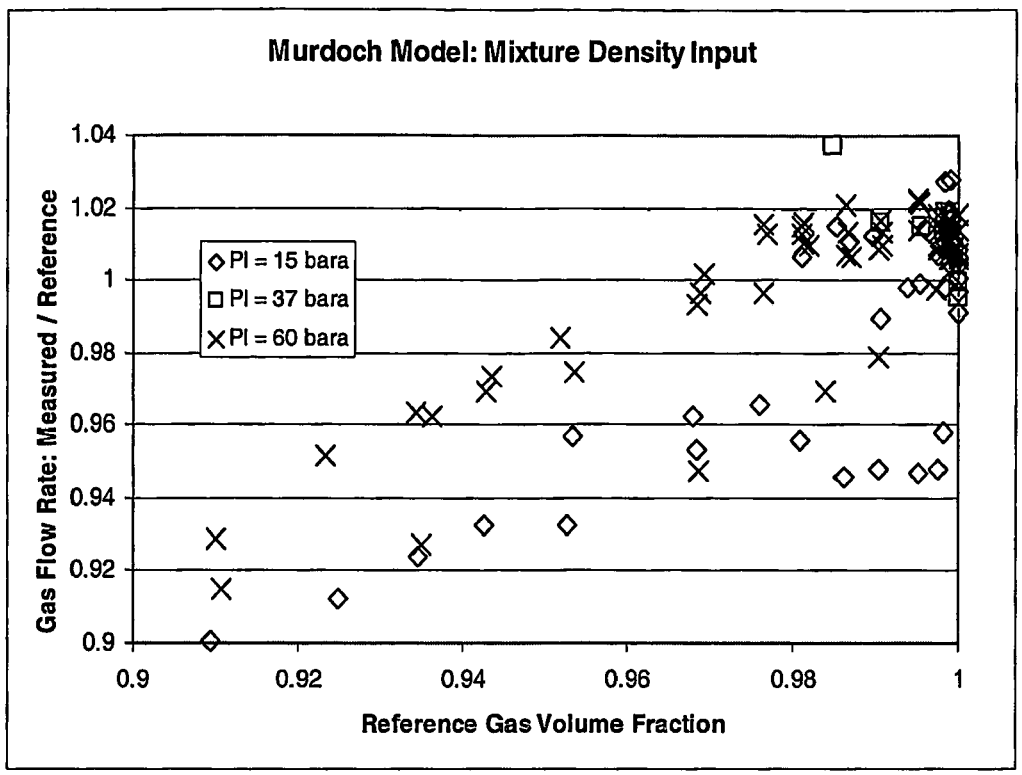
FIG. 10 shows a plot of the relative error in predicted gas volumetric flow rate as a function of reference GVF for the same data as FIG. 9.
Figure 11:
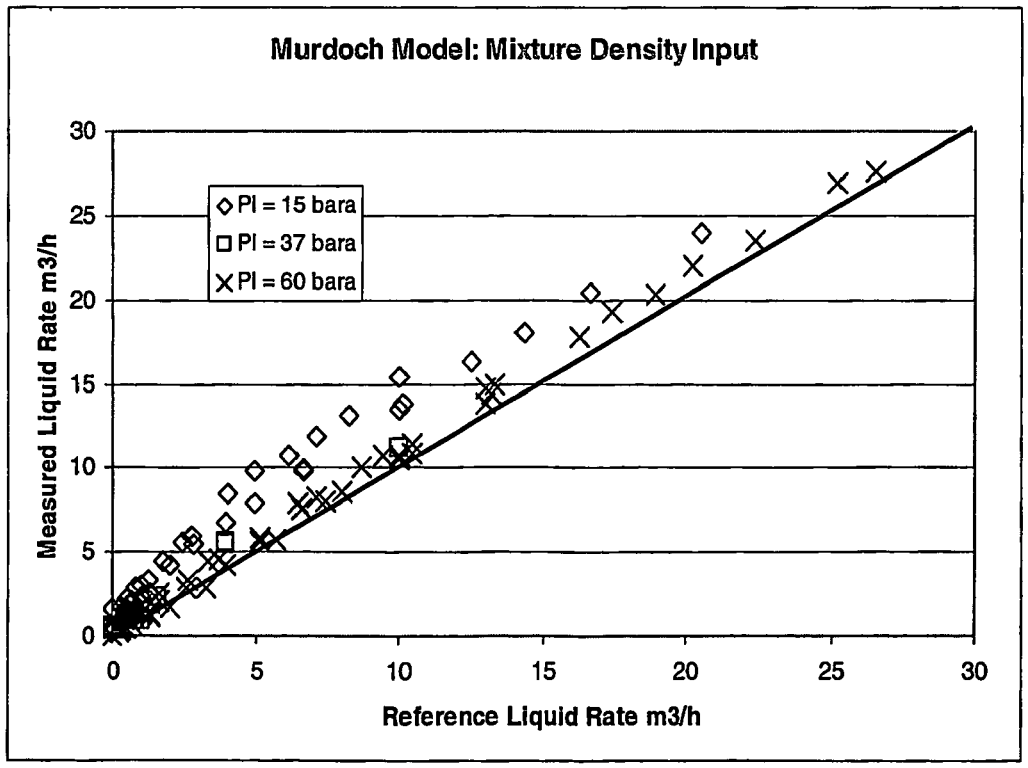
FIG. 11 shows a plot of predicted liquid volumetric flow rate against the reference liquid volumetric flow rate for the same data as FIG. 9.

The tuned Murdock correlation and a further set of (relatively high pressure) VenturiX™ flow loop data were used to make further predictions. FIGS. 9, 10 and 11 show respectively (i) the predicted volumetric gas flow rate, $q_g$, plotted against the reference gas volumetric-flow rate, (ii) the relative error in $q_g$ as a function of reference GVF, and (iii) the predicted liquid volumetric flow rate, $q_l$, plotted against the reference liquid volumetric flow rate. $q_g$ and $g_l$ were obtained in the same way as the previous predictions except that, instead of using a slip law, the GVF was equated to the gas hold up, i.e.

$$GVF = \alpha_g = \frac{\rho_l - \rho_m}{\rho_l - \rho_g}$$

This substantially simplified the calculations and from FIGS. 9, 10 and 11 it is clear that, for the range of line pressures investigated, the only significant sacrifice was a slight reduction in the accuracy of the predicted liquid volumetric flow rate at lower pressures.

Error Budgets

Using the tuned Murdock correlation, the uncertainties in the liquid and gas volumetric flow rates, $\delta q_l$ and $\delta q_g$, from an uncertainty $\delta$GVF in the GVF are:

$$q_g = \frac{q_{tp}}{1 + M\sqrt{\frac{\rho_l}{\rho_g}}\left(\frac{1-GVF}{GVF}\right)\frac{C_g \varepsilon}{C_l}}$$

$$q_{tp} = C_g EA_T \varepsilon \sqrt{\frac{2\Delta P^*}{\rho_g}}$$

$$\left.\frac{\delta q_g}{q_g}\right|_{GVF} = \frac{\delta GVF}{\left[1 + M\sqrt{\frac{\rho_l}{\rho_g}}\frac{C_g \varepsilon}{C_l}\frac{1}{GVF} - 1\right]GVF^2}$$

$$\left.\frac{\delta q_g}{q_g}\right|_{q_{tp}} = \frac{\delta q_{tp}}{q_{tp}}$$

$$q_l = q_g \left(\frac{1-GVF}{GVF}\right)$$

$$\left.\left(\frac{\delta q_l}{q_l}\right)^2\right|_{GVF,q_l} = \left(\frac{\delta q_g}{q_g}\right)^2 + \left(\frac{\delta GVF}{GVF(1-GVF)}\right)^2$$

Figure 12:
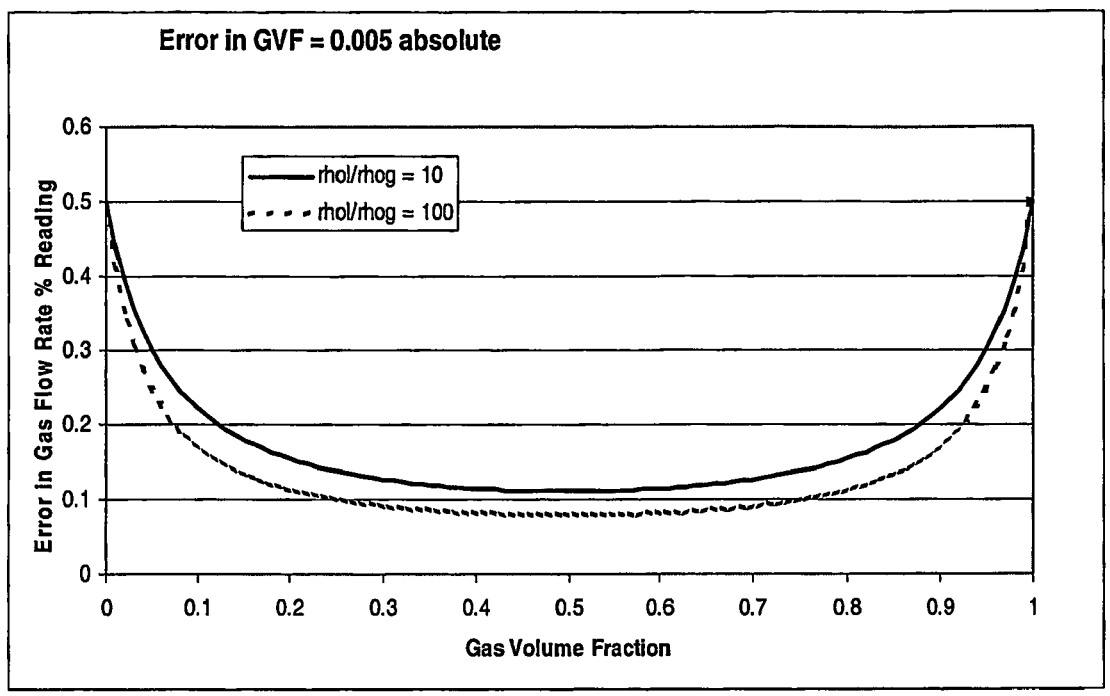
FIG. 12 shows a plot of the percentage error in the predicted gas volumetric flow rate resulting from an uncertainty in the GVF of 0.005 absolute for the same data as FIG. 2.

FIG. 12 shows the percentage error in the predicted gas flow rate resulting from an uncertainty in the GVF of 0.005 absolute; the maximum error of 0.5% occurs when the GVF=0 or 1. It should be noted that there may also be an error in the gas flow rate associated with uncertainty in the parameter $q_{tp}$.

Figure 13:
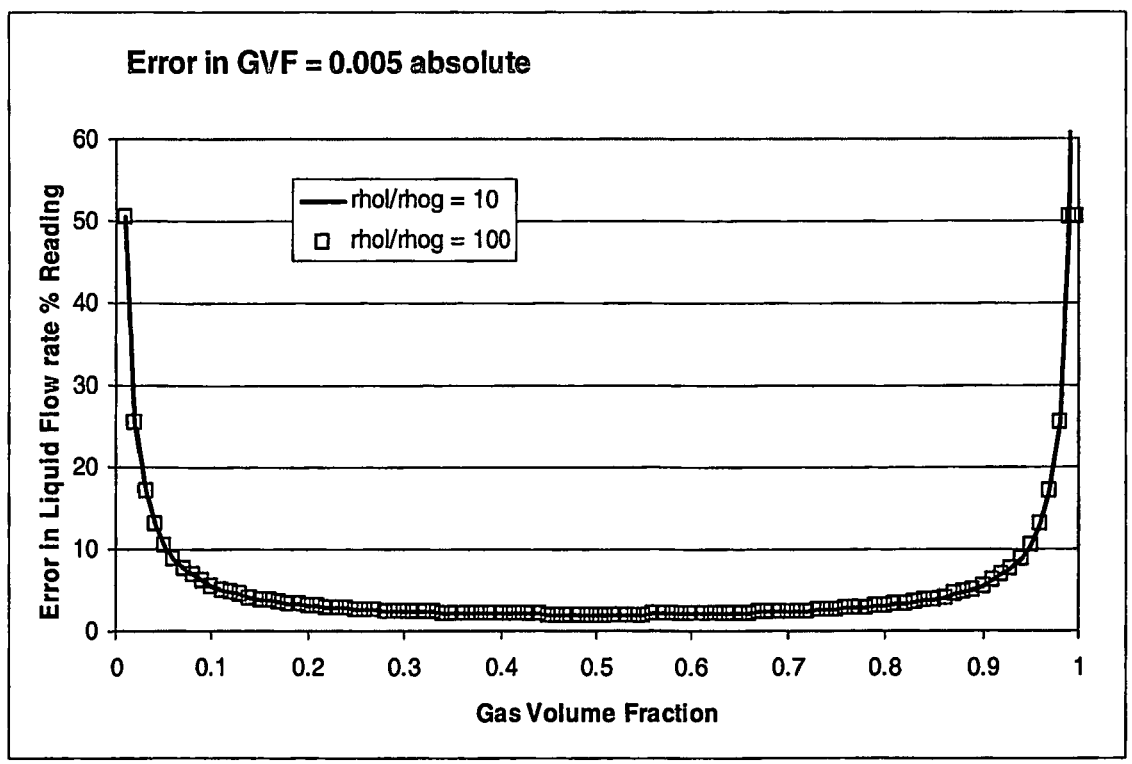
FIG. 13 shows a plot of the percentage error in the predicted liquid volumetric flow rate resulting from an uncertainty in the GVF of 0.005 absolute for the same data as FIG. 2.

FIG. 13 shows the percentage error in the liquid flow rate resulting from the same error in the GVF; the maximum error is when the GVF=0 or 1. Note that there is no pressure effect (gas density) in this uncertainty calculation.

The correlations also require an input of the liquid density, $\rho_l$, which can be difficult to measure at high GVF. However, the oil and water single phase densities at line conditions bound the liquid density, and thus the maximum error in the liquid density, $\delta \rho_l$, is:

$$\rho_o \le \rho_l \le \rho_w$$

$$\delta\rho_l \le \pm\left(\frac{\rho_w - \rho_o}{2}\right)$$

The uncertainties in the liquid and gas volumetric flow rates from an uncertainty $\delta\rho_l$ are:

$$\left.\frac{\delta q_g}{q_g}\right|_{\rho_l} = \frac{\delta\rho_l}{\rho_l} \left[\frac{0.5M\left(\frac{1-GVF}{GVF}\right)\frac{C_g\varepsilon}{C_1}\sqrt{\frac{\rho_l}{\rho_g}}}{1 + M\left(\frac{1-GVF}{GVF}\right)\frac{C_g\varepsilon}{C_1}\sqrt{\frac{\rho_l}{\rho_g}}}\right]$$

$$M \approx 2$$

$$\frac{C_g\varepsilon}{C_1} \approx 1$$

$$\left.\frac{\delta q_g}{q_g}\right|_{\rho_l} = \frac{\delta\rho_l}{\rho_l} G$$

$$G = \frac{\left(\frac{1-GVF}{GVF}\right)\sqrt{\frac{\rho_l}{\rho_g}}}{1 + 2\left(\frac{1-GVF}{GVF}\right)\sqrt{\frac{\rho_l}{\rho_g}}}$$

$$q_l = q_g\left(\frac{1-GVF}{GVF}\right)$$

$$\left.\frac{\delta q_l}{q_l}\right|_{\rho_l} = \frac{\delta q_g}{q_g}|_{\rho_l}$$

Figure 14:
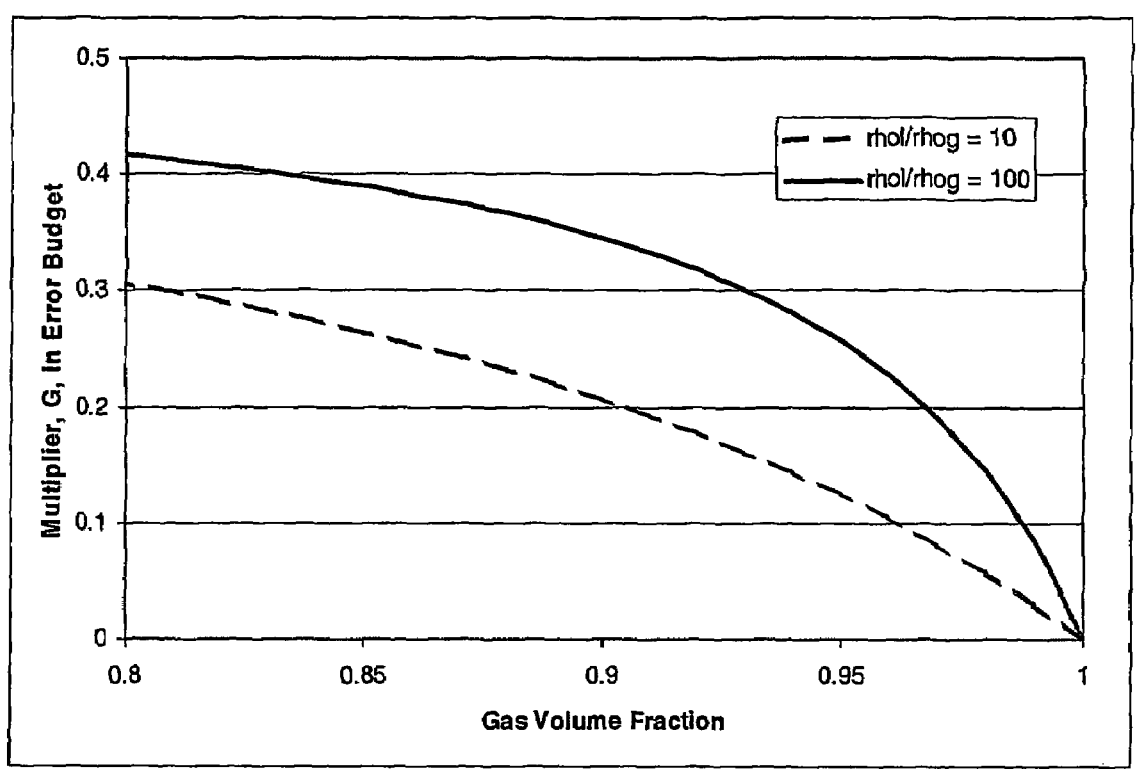
FIG. 14 shows the parameter $$G = \frac{\left(\frac{1-GVF}{GVF}\right)\sqrt{\frac{\rho_l}{\rho_g}}}{1+2\left(\frac{1-GVF}{GVF}\right)\sqrt{\frac{\rho_l}{\rho_g}}}$$

FIG. 14 shows the parameter G as a function of GVF. There is a slight dependence on gas density and G is of the order of 0.1 for GVF=95% (G=0 for GVF=100%). The error in the gas flow rate is driven by the liquid density contrast.

Underlying the conventional implementation of the VenturiX™ system is an initial assumption that the total mass flow rate of the mixture is approximately equal to the liquid mass flow rate. In contrast, the method of the present invention takes the total volume flow rate as a first approximation for the gas volume flow rate. Thus the gas flow rate prediction is good at GVF>85% when the liquid volume flow rate is a small fraction of the total volume flow rate. The relative weakness in the liquid flow rate prediction comes from the input GVF estimate.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A method of determining a gas flow rate of a gas-liquid mixture which has a gas volume fraction (GVF) of at least 85% and which is conveyed along a conduit fitted with a differential pressure flow meter and a fluid densitometer, the method comprising:
    measuring a pressure difference across the differential pressure flow meter and measuring a density of the mixture using the densitometer;
    estimating the GVF of the mixture from the measured density; and
    calculating the gas flow rate from the measured pressure difference, the measured density and a corrective term, wherein the corrective term comprises the estimated GVF and is used in the calculation to correct the gas flow rate for the high GVF value of the mixture.

2. A method according to claim 1, wherein the densitometer is a gamma-ray densitometer.

3. A method according to claim 1, wherein the differential pressure flow meter is a Venturi flow meter.

4. A method according to claim 1, wherein the flow meter is arranged such that the flow through the meter is substantially vertical.

5. A method according to claim 1, wherein the corrective term comprises a form of the Lockhart-Martinelli parameter.

6. A method according to claim 1, wherein the GVF of the mixture is at least 90%.

7. A method according to claim 1, wherein the gas flow rate is calculated to an accuracy of at least ±15%.

8. A method according to claim 1, further comprising calculating a liquid flow rate of the mixture from the calculated gas flow rate and the estimated GVF.

9. A method according to claim 1, wherein the gas-liquid mixture is production fluid from a hydrocarbon well.

10. An apparatus for determining a gas flow rate of a gas-liquid mixture which has a gas volume fraction (GVF) of at least 85% and which is conveyed along a conduit, the apparatus comprising:
    a differential pressure flow meter and a fluid densitometer which are adapted to be fitted to the conduit, whereby, in use, a pressure difference is measured across the flow meter and a density of the mixture is measured by the densitometer; and
    a processor which is configured to (a) estimate the GVF of the mixture from the measured density, and (b) calculate the gas flow rate from the measured pressure difference, the measured density and a corrective term, wherein the corrective term comprises the estimated GVF and is used in the calculation to correct the gas flow rate for the high GVF value of the mixture.

11. An apparatus according to claim 10, wherein the densitometer is a gamma-ray densitometer.

12. An apparatus according to claim 10, wherein the differential pressure flow meter is a Venturi flow meter.

13. An apparatus according to any one of claims 10, wherein the flow meter is arranged such that, in use, the flow through the meter is substantially vertical.

14. An apparatus according to any one of claims 10, wherein the corrective term comprises a form of the Lockhart-Martinelli parameter.

15. An apparatus according to any one of claims 10, wherein the GVF of the mixture is at least 90%.

16. An apparatus according to any one of claims 10, wherein the gas flow rate is calculated to an accuracy of at least ±15%.

17. An apparatus according to any one of claims 10, a wherein the processor is further configured to (c) calculate a liquid flow rate of the mixture from the calculated gas flow rate and the estimated GVF.

18. An apparatus according to any one of claims 10, wherein the gas-liquid mixture is production fluid from a hydrocarbon well.

19. An apparatus according to any one of claims 10, which is fitted to the conduit.

* * * * *